(12) United States Patent
Chen

(10) Patent No.: US 12,720,351 B2
(45) Date of Patent: Aug. 25, 2026

(54) MEASUREMENT METHOD, DEVICE AND STORAGE MEDIUM

(71) Applicants: China Mobile Communication Co., Ltd Research Institute, Beijing (CN); China Mobile Communications Group Co., Ltd., Beijing (CN)

(72) Inventor: Jingjing Chen, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 381 days.

(21) Appl. No.: 18/257,918

(22) PCT Filed: Dec. 14, 2021

(86) PCT No.: PCT/CN2021/137833
§ 371 (c)(1),
(2) Date: Jun. 16, 2023

(87) PCT Pub. No.: WO2022/127773
PCT Pub. Date: Jun. 23, 2022

(65) Prior Publication Data
US 2024/0056860 A1 Feb. 15, 2024

(30) Foreign Application Priority Data
Dec. 17, 2020 (CN) ......................... 202011493395.5

(51) Int. Cl.
*H04W 24/10* (2009.01)

(52) U.S. Cl.
CPC .................................. *H04W 24/10* (2013.01)

(58) Field of Classification Search
CPC ... H04W 24/10; H04W 76/28; H04W 64/003; H04W 24/08; H04W 36/0083
See application file for complete search history.

(56) References Cited

U.S. PATENT DOCUMENTS

2016/0338141 A1* 11/2016 Tawashi ................ H04W 76/28
2016/0381588 A1* 12/2016 Strobl .................. H04W 24/10 455/67.11
2018/0006774 A1 1/2018 Yiu et al.
2018/0132124 A1 5/2018 Huang et al.
(Continued)

FOREIGN PATENT DOCUMENTS

CN 111417189 A 7/2020
JP 2018515952 A 6/2018
(Continued)

OTHER PUBLICATIONS

Huawei, Hisilicon, "Impact of positioning on existing RRM requirements", 3GPP TSG-RAN WG4 Meeting #94bis-e, R4-2004366, Apr. 20-30, 2020, Electronic Meeting.
Huawei, Hisilicon, "Discussion on remaining issues in CSSF for PRS measurement", 3GPP TSG-RAN WG4 Meeting #97-e, R4-2015756, Electronic Meeting, Nov. 2-13, 2020.
(Continued)

*Primary Examiner* — Mohamed A Kamara
(74) *Attorney, Agent, or Firm* — Price Heneveld LLP

(57) ABSTRACT

A measurement method, a device and a storage medium are provided. The measurement method includes transmitting, by a network, first information to a UE, the first information including one measurement gap or at least two measurement gaps.

17 Claims, 2 Drawing Sheets receiving, by a UE, first information from a network, the first information including one measurement gap or at least two measurement gaps

301

(56) References Cited

U.S. PATENT DOCUMENTS

| | | | | |
|---|---|---|---|---|
| 2018/0324619 | A1* | 11/2018 | Harada | H04W 24/10 |
| 2019/0150015 | A1 | 5/2019 | Wei et al. | |
| 2020/0137601 | A1* | 4/2020 | Siomina | H04W 4/70 |
| 2022/0014955 | A1* | 1/2022 | Yang | H04W 72/21 |
| 2022/0167195 | A1 | 5/2022 | Zheng et al. | |
| 2022/0174623 | A1* | 6/2022 | Zheng | H04W 56/001 |
| 2023/0025902 | A1* | 1/2023 | Xu | H04W 24/10 |
| 2023/0224745 | A1* | 7/2023 | Yerramalli | H04W 24/10 370/252 |

FOREIGN PATENT DOCUMENTS

| | | | |
|---|---|---|---|
| JP | 2018517322 | A | 6/2018 |
| JP | 2019092157 | A | 6/2019 |
| JP | 2022544557 | A | 10/2022 |
| WO | 2019095277 | A1 | 5/2019 |
| WO | 2019162513 | A1 | 8/2019 |

OTHER PUBLICATIONS

CMCC, “Discussion on multiple concurrent and independent MG patterns”, 3GPP TSG-RAN WG4 Meeting #98-e, R4-2100870, Electronic Meeting, Jan. 25-Feb. 5, 2021.

Qualcomm Incorporated, “Motivations for measurement gap enhancements WI in NR R17”, 3GPP TSG-RAN Plenary Meeting #88-e, RP-200999, Online, Jun. 29-Jul. 3, 2020.

Huawei, Hisilicon, Impact of PRS measurement on existing RRM requirements, 3GPP TSG-RAN WG4 Meeting #94-e, R4-2001640, Online, Febr. 24-Mar. 6, 2020.

Intel Corporation, Further discussion on new gap patterns for NR Pos measurement, 3GPP TSG-RAN WG4 Meeting # 96-e, R4-2009740, Electronic Meeting, Aug. 17-28, 2020.

CATT, Discussion on new measurement gap patterns for positioning measurements, 3GPP RAN WG4 Meeting #96-e, R4-2009849, Electronic Meeting, Aug. 17-28, 2020.

* cited by examiner

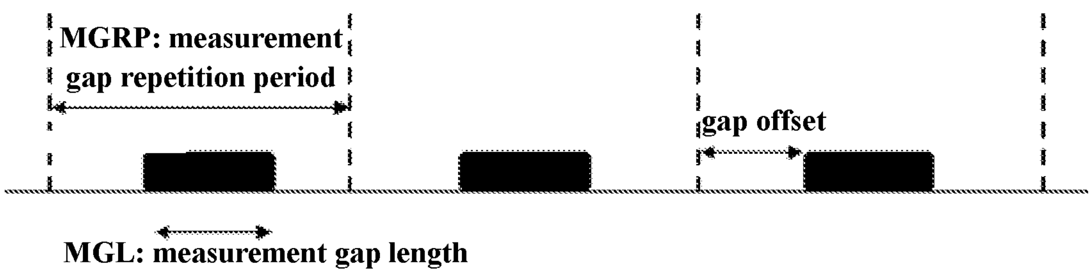
Fig. 1
transmitting, by a base station, first information to a UE, the first information including one measurement gap or at least two measurement gaps
201
Fig. 2
receiving, by a UE, first information from a network, the first information including one measurement gap or at least two measurement gaps
301
Fig. 3
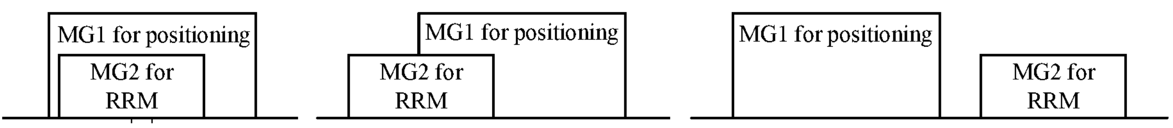
Fig. 4
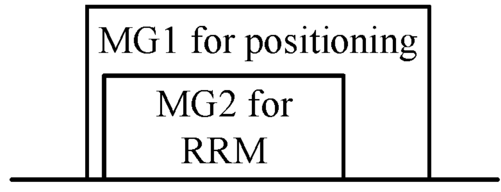
Fig. 5

MEASUREMENT METHOD, DEVICE AND STORAGE MEDIUM

CROSS-REFERENCE TO RELATED APPLICATION

This application is the U.S. national phase of PCT Application No. PCT/CN2021/137833 filed on Dec. 14, 2021, which claims the priority of the Chinese patent application No. 202011493395.5 filed in China on Dec. 17, 2020, both of which are incorporated herein by reference in their entireties.

TECHNICAL FIELD

The present disclosure relates to the field of wireless communication technology, in particular to a measurement method, a device and a storage medium.

BACKGROUND

During inter-frequency measurement, usually a User Equipment (UE) needs to configure a measurement gap in which a connection between the UE and a current serving frequency is interrupted, and the UE is tuned to perform measurement at a target Synchronization Signaling and Physical Broadcast Channel (PBCH) Block (SSB). The SSB includes a Primary Synchronization Signal (PSS), a Secondary Synchronization Signal (SSS) and a PBCH, and it may also be described as SS/PBCH block. The measurement gap is configured through Radio Resource Control (RRC), and it includes such parameters as a measurement gap repetition period, a measurement gap length and a gap offset. FIG. 1 shows a relationship among the parameters of the measurement gap. The UE measures all target frequencies on the basis of one measurement gap. Depending on a Frequency Range (FR) 1 and an FR2, maximum values of the known measurement gap length are 5 ms and 5.5 ms (without taking a radio frequency modulation time into consideration).

When positioning is performed by the UE on the basis of the position of a Positioning Reference Signal (PRS) and the target frequency for positioning is not within an activated bandwidth of the UE, the UE needs to perform the positioning-related measurement on the basis of the measurement gap.

There exists the following deficiency in the related art: it is impossible to complete the measurement in the known measurement gap due to a too large length of the PRS.

Moreover, with respect to how to measure a long PRS, there is currently no scheme to solve the problems caused after the introduction of the measurement gap for the measurement of the long PRS.

SUMMARY

An object of the present disclosure is to provide a measurement method, a device and a storage medium, so as to achieve the use or allocation of the measurement gap after the introduction of the measurement gap for the measurement of the long PRS.

The present disclosure provides the following technical solutions.

In one aspect, the present disclosure provides in some embodiments a measurement method, including transmitting, by a network, first information to a UE, the first information including one measurement gap or at least two measurement gaps.

In implementation, when the first information includes one measurement gap, the one measurement gap is used for at least two measurement purposes; or when the first information includes at least two measurement gaps, each of the at least two measurement gaps is used for one measurement purpose; or when the first information includes one measurement gap or at least two measurement gaps, the measurement gap is used for measurement at at least two frequency points or frequencies.

In implementation, the measurement method further includes: notifying a first factor to the UE, the first factor being used to indicate proportions or percentages of the measurement gap for different measurement purposes; and/or notifying a second factor to the UE, the second factor being used to indicate proportions or percentages of the measurement gap for different frequency points or frequencies.

In implementation, the measurement method further includes notifying a third factor to the UE, and the third factor is used to indicate usage proportions or usage percentages of different measurement gaps.

In implementation, the measurement method further includes notifying second information to the UE, the second information is used to indicate priority of the one measurement gap or the at least two measurement gaps, and the UE performs measurement in the measurement gap indicated by the priority.

In implementation, the measurement method further includes receiving, by the network, a notification indicating that a current measurement purpose has been achieved or a request for a measurement gap for the other measurement purpose from the UE.

In implementation, the measurement method further includes transmitting, by the network, third information to the UE. The third information includes at least one of: N pieces of duration information, the duration information including a usage duration of the measurement gap and/or a start position of the measurement gap, N being an integer; M timers, each timer being used to indicate a usage duration of a measurement gap, or the other measurement gap different from the current measurement gap or a measurement gap used in the timer after the timer has been expired; or Q counters, each counter being used to indicate the number of times a measurement gap is used, or the other measurement gap different from the current measurement gap or a measurement gap used in the counter after the counter has been expired.

In implementation, the network notifies the UE to use a plurality of measurement gaps through one or more of: notifying the UE to perform the measurement using a first measurement gap within a first duration upon the receipt of the first measurement gap for the first duration at a first time point, notifying the UE to perform the measurement using a second measurement gap within a second duration upon the receipt of the second measurement gap for the second duration at a second time point, and notifying the UE to perform the measurement using an $N^{th}$ measurement gap within an $N^{th}$ duration upon the receipt of the $N^{th}$ measurement gap for the $N^{th}$ duration at an $N^{th}$ time point; configuring M timers, starting a first timer after using the first measurement gap, notifying the UE to use the second measurement gap after the first timer has been expired, starting a second timer after using the second measurement gap, and notifying the UE to use an $M^{th}$ measurement gap after an (M-1)$^{th}$ timer has been expired; or configuring Q counters, notifying the UE to use the second measurement gap after a first counter has been expired, notifying the UE to use a third measurement gap after a second counter has been expired, and notifying the UE to use the M$^{th}$ measurement gap after an (M-1)$^{th}$ counter has been expired.

In implementation, the measurement method further includes one or more of: notifying priority of a plurality of measurement gaps to the UE, or agreeing with the UE in advance about the priority of the plurality of measurement gaps; or notifying usage proportions or usage percentages of different measurement gaps within a predetermined time period or at an overlapping time point to the UE.

In implementation, the measurement method further includes receiving, by the network from the UE, a measurement gap pattern or a measurement gap identifier for positioning and supported by the UE.

In implementation, the measurement method further includes: receiving, by the network from the UE, information indicating whether the UE supports to perform Radio Resource Management (RRM) using the measurement gap pattern; and/or receiving, by the network device from the UE, information indicating whether the UE supports to perform the measurement for at least two measurement purposes within the measurement gap.

In another aspect, the present disclosure provides in some embodiments a measurement method, including receiving, by a UE, first information transmitted by a network, the first information including one measurement gap or at least two measurement gaps.

In implementation, when the first information includes one measurement gap, the one measurement gap is used for at least two measurement purposes; or when the first information includes at least two measurement gaps, each of the at least two measurement gaps is used for one measurement purpose; or when the first information includes one measurement gap or at least two measurement gaps, the measurement gap is used for measurement at at least two frequency points or frequencies.

In implementation, the measurement method further includes: obtaining, by the UE, a first factor, the first factor being used to indicate proportions or percentages of the measurement gap for different measurement purposes; and/or obtaining, by the UE, a second factor, the second factor being used to indicate proportions or percentages of the measurement gap for different frequency points or frequencies.

In implementation, the measurement method further includes using, by the UE, the measurement gaps for N measurement purposes equiprobably, where N is a natural number greater than 2.

In implementation, a plurality of measurement frequencies included in an M$^{th}$ measurement purpose is taken as one frequency to share a measurement gap with frequencies for the other measurement purpose, where M is a natural number.

In implementation, the measurement method further includes obtaining, by the UE, a third factor, and the third factor is used to indicate usage proportions or usage percentages of different measurement gaps.

In implementation, the measurement method further includes receiving, by the UE, second information, the second information is used to indicate priority of the one measurement gap or the at least two measurement gaps, and the UE performs measurement in the measurement gap indicated by the priority.

In implementation, the measurement method further includes transmitting, by the UE, a notification indicating that a current measurement purpose has been achieved or a request for a measurement gap for the other measurement purpose to the network.

In implementation, the measurement method further includes receiving, by the UE, third information transmitted by the network. The third information includes at least one of: N pieces of duration information, the duration information including a usage duration of the measurement gap and/or a start position of the measurement gap, N being an integer; M timers, each timer being used to indicate a usage duration of a measurement gap, or the other measurement gap different from the current measurement gap or a measurement gap used in the timer after the timer has been expired; or Q counters, each counter being used to indicate the number of times a measurement gap is used, or the other measurement gap different from the current measurement gap or a measurement gap used in the counter after the counter has been expired.

In implementation, the UE uses a plurality of measurement gaps through one or more of: performing the measurement using a first measurement gap within a first duration upon the receipt of the first measurement gap for the first duration at a first time point, performing the measurement using a second measurement gap within a second duration upon the receipt of the second measurement gap for the second duration at a second time point, and performing the measurement using an N$^{th}$ measurement gap within an N$^{th}$ duration upon the receipt of the N$^{th}$ measurement gap for the N$^{th}$ duration at an N$^{th}$ time point; configuring M timers, starting a first timer after using the first measurement gap, using the second measurement gap after the first timer has been expired, starting a second timer after using the second measurement gap, and using an M$^{th}$ measurement gap after an (M-1)$^{th}$ timer has been expired; or configuring Q counters, using the second measurement gap after a first counter has been expired, using a third measurement gap after a second counter has been expired, and using the M$^{th}$ measurement gap after an (M-1)$^{th}$ counter has been expired.

In implementation, the measurement method further includes one or more of: receiving priority of a plurality of measurement gaps from the network, or agreeing with the network in advance about the priority of the plurality of measurement gaps; or receiving usage proportions or usage percentages of different measurement gaps within a predetermined time period or at an overlapping time point from the network.

In implementation, the measurement method further includes reporting, by the UE to the network, a measurement gap pattern or a measurement gap identifier for positioning and supported by the UE.

In implementation, the measurement method further includes: reporting, by the UE to the network, information indicating whether the UE supports to perform RRM using the measurement gap pattern; and/or reporting, by the UE to the network, information indicating whether the UE supports to perform the measurement for at least two measurement purposes within the measurement gap.

In yet another aspect, the present disclosure provides in some embodiments a base station, including: a processor configured to read a program in a memory, so as to transmit first information to a UE, the first information including one measurement gap or at least two measurement gaps; and a transceiver configured to receive and transmit data under the control of the processor.

In implementation, when the first information includes one measurement gap, the one measurement gap is used for at least two measurement purposes; or when the first information includes at least two measurement gaps, each of the at least two measurement gaps is used for one measurement purpose; or when the first information includes one measurement gap or at least two measurement gaps, the measurement gap is used for measurement at at least two frequency points or frequencies.

In implementation, the processor is further configured to: notify a first factor to the UE, the first factor being used to indicate proportions or percentages of the measurement gap for different measurement purposes; and/or notify a second factor to the UE, the second factor being used to indicate proportions or percentages of the measurement gap for different frequency points or frequencies.

In implementation, the processor is further configured to notify a third factor to the UE, and the third factor is used to indicate usage proportions or usage percentages of different measurement gaps.

In implementation, the processor is further configured to notify second information to the UE, the second information is used to indicate priority of the one measurement gap or the at least two measurement gaps, and the UE performs measurement in the measurement gap indicated by the priority.

In implementation, the processor is further configured to receive a notification indicating that a current measurement purpose has been achieved or a request for a measurement gap for the other measurement purpose from the UE.

In implementation, the processor is further configured to transmit third information to the UE. The third information includes at least one of: N pieces of duration information, the duration information including a usage duration of the measurement gap and/or a start position of the measurement gap, N being an integer; M timers, each timer being used to indicate a usage duration of a measurement gap, or the other measurement gap different from the current measurement gap or a measurement gap used in the timer after the timer has been expired; or Q counters, each counter being used to indicate the number of times a measurement gap is used, or the other measurement gap different from the current measurement gap or a measurement gap used in the counter after the counter has been expired.

In implementation, the base station notifies the UE to use a plurality of measurement gaps through one or more of: notifying the UE to perform the measurement using a first measurement gap within a first duration upon the receipt of the first measurement gap for the first duration at a first time point, notifying the UE to perform the measurement using a second measurement gap within a second duration upon the receipt of the second measurement gap for the second duration at a second time point, and notifying the UE to perform the measurement using an $N^{th}$ measurement gap within an $N^{th}$ duration upon the receipt of the $N^{th}$ measurement gap for the $N^{th}$ duration at an $N^{th}$ time point; configuring M timers, starting a first timer after using the first measurement gap, notifying the UE to use the second measurement gap after the first timer has been expired, starting a second timer after using the second measurement gap, and notifying the UE to use an $M^{th}$ measurement gap after an $(M-1)^{th}$ timer has been expired; or configuring Q counters, notifying the UE to use the second measurement gap after a first counter has been expired, notifying the UE to use a third measurement gap after a second counter has been expired, and notifying the UE to use the $M^{th}$ measurement gap after an $(M-1)^{th}$ counter has been expired.

In implementation, the processor is further configured to perform one or more of: notifying priority of a plurality of measurement gaps to the UE, or agreeing with the UE in advance about the priority of the plurality of measurement gaps; or notifying usage proportions or usage percentages of different measurement gaps within a predetermined time period or at an overlapping time point to the UE.

In implementation, the processor is further configured to receive from the UE a measurement gap pattern or a measurement gap identifier for positioning and supported by the UE.

In implementation, the processor is further configured to: receive from the UE information indicating whether the UE supports to perform RRM using the measurement gap pattern; and/or receive from the UE, information indicating whether the UE supports to perform the measurement for at least two measurement purposes within the measurement gap.

In still yet another aspect, the present disclosure provides in some embodiments a base station, including a base station transmission module configured to transmit first information to a UE, the first information including one measurement gap or at least two measurement gaps.

In implementation, when the first information includes one measurement gap, the one measurement gap is used for at least two measurement purposes; or when the first information includes at least two measurement gaps, each of the at least two measurement gaps is used for one measurement purpose; or when the first information includes one measurement gap or at least two measurement gaps, the measurement gap is used for measurement at at least two frequency points or frequencies.

In implementation, the base station transmission module is further configured to: notify a first factor to the UE, the first factor being used to indicate proportions or percentages of the measurement gap for different measurement purposes; and/or notify a second factor to the UE, the second factor being used to indicate proportions or percentages of the measurement gap for different frequency points or frequencies.

In implementation, the base station transmission module is further configured to notify a third factor to the UE, and the third factor is used to indicate usage proportions or usage percentages of different measurement gaps.

In implementation, the base station transmission module is further configured to notify second information to the UE, the second information is used to indicate priority of the one measurement gap or the at least two measurement gaps, and the UE performs measurement in the measurement gap indicated by the priority.

In implementation, the base station further includes a base station reception module configured to receive a notification indicating that a current measurement purpose has been achieved or a request for a measurement gap for the other measurement purpose from the UE.

In implementation, the base station transmission module is further configured to transmit third information to the UE. The third information includes at least one of: N pieces of duration information, the duration information including a usage duration of the measurement gap and/or a start position of the measurement gap, N being an integer; M timers, each timer being used to indicate a usage duration of a measurement gap, or the other measurement gap different from the current measurement gap or a measurement gap used in the timer after the timer has been expired; or Q counters, each counter being used to indicate the number of times a measurement gap is used, or the other measurement gap different from the current measurement gap or a measurement gap used in the counter after the counter has been expired.

In implementation, the base station transmission module is further configured to notify the UE to use a plurality of measurement gaps through one or more of: notifying the UE to perform the measurement using a first measurement gap within a first duration upon the receipt of the first measurement gap for the first duration at a first time point, notifying the UE to perform the measurement using a second measurement gap within a second duration upon the receipt of the second measurement gap for the second duration at a second time point, and notifying the UE to perform the measurement using an $N^{th}$ measurement gap within an $N^{th}$ duration upon the receipt of the $N^{th}$ measurement gap for the $N^{th}$ duration at an $N^{th}$ time point; configuring M timers, starting a first timer after using the first measurement gap, notifying the UE to use the second measurement gap after the first timer has been expired, starting a second timer after using the second measurement gap, and notifying the UE to use an $M^{th}$ measurement gap after an $(M-1)^{th}$ timer has been expired; or configuring Q counters, notifying the UE to use the second measurement gap after a first counter has been expired, notifying the UE to use a third measurement gap after a second counter has been expired, and notifying the UE to use the $M^{th}$ measurement gap after an $(M-1)^{th}$ counter has been expired.

In implementation, the base station transmission module is further configured to perform one or more of: indicating priority of a plurality of measurement gaps to the UE, or agreeing with the UE in advance about the priority of the plurality of measurement gaps; or indicating usage proportions or usage percentages of different measurement gaps within a predetermined time period or at an overlapping time point to the UE.

In implementation, the base station transmission module is further configured to receive from the UE a measurement gap pattern or a measurement gap identifier for positioning and supported by the UE.

In implementation, the base station transmission module is further configured to: receive from the UE information indicating whether the UE supports to perform RRM using the measurement gap pattern; and/or receive from the UE, information indicating whether the UE supports to perform the measurement for at least two measurement purposes within the measurement gap.

In still yet another aspect, the present disclosure provides in some embodiments a UE, including: a processor configured to read a program in a memory, so as to receive first information transmitted by a network, the first information including one measurement gap or at least two measurement gaps; and a transceiver configured to receive and transmit data under the control of the processor.

In implementation, when the first information includes one measurement gap, the one measurement gap is used for at least two measurement purposes; or when the first information includes at least two measurement gaps, each of the at least two measurement gaps is used for one measurement purpose; or when the first information includes one measurement gap or at least two measurement gaps, the measurement gap is used for measurement at at least two frequency points or frequencies.

In implementation, the processor is further configured to: obtain a first factor, the first factor being used to indicate proportions or percentages of the measurement gap for different measurement purposes; and/or obtain a second factor to the UE, the second factor being used to indicate proportions or percentages of the measurement gap for different frequency points or frequencies.

In implementation, the processor is further configured to use the measurement gaps for N measurement purposes equiprobably, where N is a natural number greater than 2.

In implementation, a plurality of measurement frequencies included in an $M^{th}$ measurement purpose is taken as one frequency to share a measurement gap with frequencies for the other measurement purpose, where M is a natural number.

In implementation, the processor is further configured to use a third factor, and the third factor is used to indicate usage proportions or usage percentages of different measurement gaps.

In implementation, the processor is further configured to receive second information, the second information is used to indicate priority level of the one measurement gap or the at least two measurement gaps, and the UE performs measurement in the measurement gap indicated by the priority.

In implementation, the processor is further configured to transmit a notification indicating that a current measurement purpose has been achieved or a request for a measurement gap for the other measurement purpose to the network.

In implementation, the processor is further configured to receive third information transmitted by the network. The third information includes at least one of: N pieces of duration information, the duration information including a usage duration of the measurement gap and/or a start position of the measurement gap, N being an integer; M timers, each timer being used to indicate a usage duration of a measurement gap, or the other measurement gap different from the current measurement gap or a measurement gap used in the timer after the timer has been expired; or Q counters, each counter being used to indicate the number of times a measurement gap is used, or the other measurement gap different from the current measurement gap or a measurement gap used in the counter after the counter has been expired.

In implementation, the processor is configured to use a plurality of measurement gaps through one or more of: performing the measurement using a first measurement gap within a first duration upon the receipt of the first measurement gap for the first duration at a first time point, performing the measurement using a second measurement gap within a second duration upon the receipt of the second measurement gap for the second duration at a second time point, and performing the measurement using an $N^{th}$ measurement gap within an $N^{th}$ duration upon the receipt of the $N^{th}$ measurement gap for the $N^{th}$ duration at an $N^{th}$ time point; configuring M timers, starting a first timer after using the first measurement gap, using the second measurement gap after the first timer has been expired, starting a second timer after using the second measurement gap, and using an $M^{th}$ measurement gap after an $(M-1)^{th}$ timer has been expired; or configuring Q counters, using the second measurement gap after a first counter has been expired, using a third measurement gap after a second counter has been expired, and using the $M^{th}$ measurement gap after an $(M-1)^{th}$ counter has been expired.

In implementation, the processor is further configured to perform one or more of: receiving priority of a plurality of measurement gaps from the network, or agreeing with the network in advance about the priority of the plurality of measurement gaps; or receiving usage proportions or usage percentages of different measurement gaps within a predetermined time period or at an overlapping time point from the network.

In implementation, the processor is further configured to report to the network a measurement gap pattern or a measurement gap identifier for positioning and supported by the UE.

In implementation, the processor is further configured to: report to the network information indicating whether the UE supports to perform RRM using the measurement gap pattern; and/or report to the network information indicating whether the UE supports to perform the measurement for at least two measurement purposes within the measurement gap.

In still yet another aspect, the present disclosure provides in some embodiments a UE, including a UE reception module configured to receive first information transmitted by a network, the first information including one measurement gap or at least two measurement gaps.

In implementation, when the first information includes one measurement gap, the one measurement gap is used for at least two measurement purposes; or when the first information includes at least two measurement gaps, each of the at least two measurement gaps is used for one measurement purpose; or when the first information includes one measurement gap or at least two measurement gaps, the measurement gap is used for measurement at at least two frequency points or frequencies.

In implementation, the UE reception module is further configured to obtain a first factor, and the first factor is used to indicate proportions or percentages of the measurement gap for different measurement purposes.

In implementation, the UE further includes a UE measurement module configured to use the measurement gaps for N measurement purposes equiprobably, where N is a natural number greater than 2.

In implementation, a plurality of measurement frequencies included in an $M^{th}$ measurement purpose is taken as one frequency to share a measurement gap with frequencies for the other measurement purpose, where M is a natural number.

In implementation, the UE reception module is further configured to use a third factor, and the third factor is used to indicate usage proportions or usage percentages of different measurement gaps.

In implementation, the UE reception module is further configured to receive second information, the second information is used to indicate priority level of the one measurement gap or the at least two measurement gaps, and the UE performs measurement in the measurement gap indicated by the priority.

In implementation, the UE reception module is further configured to transmit a notification indicating that a current measurement purpose has been achieved or a request for a measurement gap for the other measurement purpose to the network.

In implementation, the UE reception module is further configured to receive third information transmitted by the network. The third information includes at least one of: N pieces of duration information, the duration information including a usage duration of the measurement gap and/or a start position of the measurement gap, N being an integer; M timers, each timer being used to indicate a usage duration of a measurement gap, or the other measurement gap different from the current measurement gap or a measurement gap used in the timer after the timer has been expired; or Q counters, each counter being used to indicate the number of times a measurement gap is used, or the other measurement gap different from the current measurement gap or a measurement gap used in the counter after the counter has been expired.

In implementation, the UE measurement module is further configured to use a plurality of measurement gaps through one or more of: performing the measurement using a first measurement gap within a first duration upon the receipt of the first measurement gap for the first duration at a first time point, performing the measurement using a second measurement gap within a second duration upon the receipt of the second measurement gap for the second duration at a second time point, and performing the measurement using an $N^{th}$ measurement gap within an $N^{th}$ duration upon the receipt of the $N^{th}$ measurement gap for the $N^{th}$ duration at an $N^{th}$ time point; configuring M timers, starting a first timer after using the first measurement gap, using the second measurement gap after the first timer has been expired, starting a second timer after using the second measurement gap, and using an $M^{th}$ measurement gap after an $(M-1)^{th}$ timer has been expired; or configuring Q counters, using the second measurement gap after a first counter has been expired, using a third measurement gap after a second counter has been expired, and using the $M^{th}$ measurement gap after an $(M-1)^{th}$ counter has been expired.

In implementation, the UE reception module is further configured to: receive priority of a plurality of measurement gaps from the network, or agreeing with the network in advance about the priority of the plurality of measurement gaps; and/or receive usage proportions or usage percentages of different measurement gaps within a predetermined time period or at an overlapping time point from the network.

In implementation, the UE reception module is further configured to report to the network a measurement gap pattern or a measurement gap identifier for positioning and supported by the UE.

In implementation, the UE reception module is further configured to: report to the network information indicating whether the UE supports to perform RRM using the measurement gap pattern; and/or report to the network information indicating whether the UE supports to perform the measurement for at least two measurement purposes within the measurement gap.

In still yet another aspect, the present disclosure provides in some embodiments a computer-readable storage medium storing therein a computer program for implementing the above-mentioned measurement method.

In still yet another aspect, the present disclosure provides in some embodiments a computer program product stored in a non-volatile storage medium. The computer program product is executed by at least one processor so as to implement the above-mentioned measurement method.

The present disclosure has the following beneficial effects.

In order to measure a long PRS, when a measurement gap for the measurement of the long PRS is introduced, the other measurement purposes (e.g., RRM measurement) may be adversely affected. For example, when a measurement gap for the measurement of the PRS is also used for the other measurement purpose, it is necessary to use or allocate a same measurement gap for a plurality of measurement purposes. In addition, when a measurement gap for positioning is not used for the other measurement purpose (e.g., RRM measurement), a plurality of measurement gaps needs to be configured for different measurement purposes, and at this time, it is necessary for the UE to use or allocate the plurality of measurement gaps. Based on the above, in the embodiments of the present disclosure, the base station transmits the first information to the UE, and the first information includes one measurement gap or at least two measurement gaps. Therefore, when there is a plurality of measurement purposes, it is able to use or allocate a same measurement gap for each measurement purpose in accordance with the practical need, thereby to achieve the measurement purpose through the other configured measurement gap even in the case of a dedicated measurement gap.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the present disclosure. In these drawings, FIG. 1 is a schematic view showing a relationship among parameters of a measurement gap in the related art;

FIG. 2 is a flow chart of a measurement gap pattern method at a base station side according to an embodiment of the present disclosure;

FIG. 3 is a flow chart of a measurement gap pattern method at a UE side according to an embodiment of the present disclosure;

FIG. 4 is a schematic view showing a relationship among time-domain positions of the measurement gaps according to an embodiment of the present disclosure;

FIG. 5 is a schematic view showing a usage ratio or a usage percentage of the measurement gaps according to an embodiment of the present disclosure;

DETAILED DESCRIPTION

Figures 6, 7:
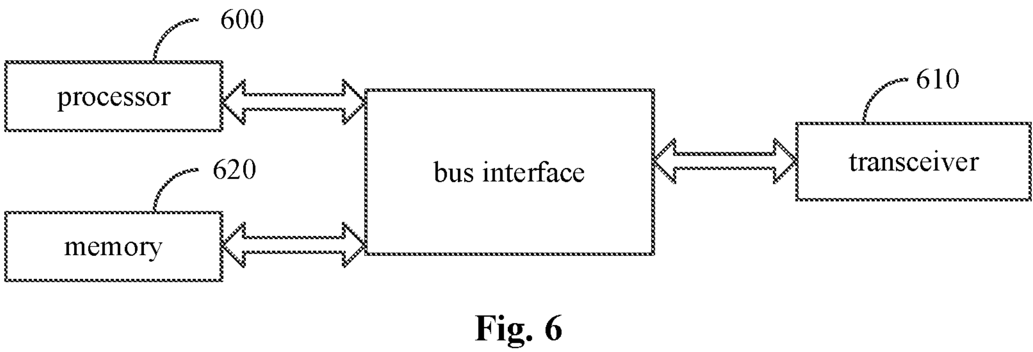
FIG. 6 is a schematic view showing a base station according to an embodiment of the present disclosure.
FIG. 7 is a schematic view showing a UE according to an embodiment of the present disclosure.

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

It is found that, a length of a PRS is associated with the quantity of symbols, the quantity of resources, repetition, and a Sub-Carrier Spacing (SCS), i.e., the length of the PRS is influenced by the plurality of factors, and the PRS has different lengths due to different values of the factors. To be specific, the quantity of Orthogonal Frequency Division Multiplex (OFDM) symbols occupied within each slot is {2,4,6,12}, the quantity of resources is 8 at most for an FR1 and 64 for FR2, the times of repetitions is {1,2,4,8,16,32}, and the SCS is {15,30,60,120} KHz.

As mentioned hereinabove, the length of the PRS is associated with the quantity of symbols, the quantity of resources, the repetition and the SCS, i.e., the length of the PRS is influenced by the plurality of factors, and the PRS has different lengths due to different values of the factors. Due to various values of the factors, the length of the PRS may exceed a measurement gap length in some configurations. Table 1 shows the length of the PRS. In Table 1, there exist some configurations in which it is impossible to receive the entire PRS within a measurement gap, so the measurement performance may be adversely affected.

TABLE 1

| Quantity of symbols | Quantity of resources | Repetition | SCS | PRS length (in ms) |
|---|---|---|---|---|
| 4 | 8 | 4 | 15 KHz | 12 |
| 6 | 8 | 4 | 30 KHz | 8 |
| 4 | 64 | 2 | 60 KHz | 11 |
| 6 | 64 | 4 | 120 KHz | 16 |

In order to solve the problem that it is impossible to complete the measurement within an existing measurement gap due to a too large length of the PRS, as a feasible scheme, a new measurement gap is introduced. However, when the new measurement gap is introduced, RRM measurement may be adversely affected, i.e., new problems may occur, e.g., whether the newly-introduced measurement gap is capable of being used for the RRM measurement, whether the newly-introduced measurement gap and the existing measurement gap are capable of existing concurrently, and which behaviors are to be taken by a UE.

In order to measure the long PRS, a core issue lies in the influences on the other measurement purpose (e.g., RRM measurement) after the introduction of the measurement gap for the measurement of the long PRS, as well as how to remove these influences. To be specific, when a measurement gap for the measurement of the PRS may be also used for the other measurement purpose, it is necessary to use or allocate a same measurement gap for a plurality of measurement purposes. In addition, when a measurement gap for positioning may not be used for the other measurement purpose (e.g., RRM measurement), a plurality of measurement gaps needs to be configured for different measurement purposes, and at this time, it is necessary for the UE to use or allocate the plurality of measurement gaps.

Based on the above, an object of the present disclosure is to provide a measurement scheme, so as to solve one or more of the above-mentioned problems due to the impaction of the newly-introduced measurement gap on the RRM measurement. The measurement scheme will be described hereinafter in conjunction with the drawings and embodiments.

The following description will be given from both a UE side and a base station side. In addition, a cooperative instance is provided so as to facilitate the understanding of the scheme in the embodiments of the present disclosure. However, it does not mean that the scheme must be implemented cooperatively or separately. In actual use, when the scheme is implemented by the UE and the base station separately, it is also able to solve the problems at the UE side and the base station side. When the scheme is adopted cooperatively, it is able to achieve a better effect.

As shown in FIG. 2, the present disclosure provides in some embodiments a measurement method for a base station, which includes Step 201 of transmitting, by the base station, first information to a UE, the first information including one measurement gap or at least two measurement gaps.

As shown in FIG. 3, the present disclosure provides in some embodiments a measurement method for a UE, which includes Step 301 of receiving, by the UE, first information from a network, the first information including one measurement gap or at least two measurement gaps.

During the implementation, when the first information includes one measurement gap, the one measurement gap is used for at least two measurement purposes; or when the first information includes at least two measurement gaps, each of the at least two measurement gaps is used for one measurement purpose; or when the first information includes one measurement gap or at least two measurement gaps, the measurement gap is used for measurement at at least two frequencies.

To be specific, a configuration of the measurement gap includes a measurement gap repetition period, a measurement gap length, a gap offset, etc. For different measurement gaps, at least one of the above-mentioned parameters is different.

To be specific, when the first information includes one measurement gap, the measurement purpose may be positioning measurement (e.g., PRS measurement), RRM measurement (for measuring mobility, e.g., handover or reselection), or any other measurement purpose.

To be specific, a plurality of frequencies may belong to a same Radio Access Technology (RAT) or different RATs, and the RATs include Long Term Evolution (LTE) and New Radio (NR). In a possible embodiment of the present disclosure, a measurement gap i is used for the measurement at frequencies f1 and f2, and a measurement gap j is used for the measurement at frequencies f3 and f4.

When merely one measurement gap is configured, taking the PRS measurement and the RRM measurement as an example, the measurement gaps are used for both the measurement of a PRS layer and the measurement of an RRM layer.

When the first information includes at least two measurement gaps, e.g., two measurement gaps, a first measurement gap is used for a first measurement purpose (e.g., positioning measurement), and a second measurement gap is used for a second measurement purpose (e.g., RRM measurement). For each measurement purpose, there exists a plurality of measurement objects, which are also called as measurement frequencies or layers.

To be specific, in a possible embodiment of the present disclosure, a measurement gap i is used for the measurement of an SSB and/or a Channel State Information Reference Signal (CSI-RS), and a measurement gap j is used for the measurement of the PRS. In another possible embodiment of the present disclosure, a measurement gap m is used for the measurement of the SSB and a measurement gap n is used for the measurement of the CSI-RS.

When the first information includes at least two measurement gaps, a plurality of measurement gaps exists concurrently, or the plurality of measurement gaps exists within a certain time period but different measurement gaps do not overlap each other in a time domain, or the plurality of measurement gaps exists within a certain time period but different measurement gaps partially overlap each other in the time domain. Taking the measurement gap for positioning and the measurement gap for RRM measurement as an example, FIG. 4 shows a relationship among time-domain positions of the measurement gaps. When there exist two measurement gaps, FIG. 3 shows three possible relationships between the time-domain positions.

The frequencies of different kinds include frequencies of different RATs, e.g., frequencies of Long Term Evolution (LTE) (Evolution-Universal Terrestrial Radio Access Network (E-UTRAN)), frequencies of New Radio (NR), or frequencies of Global System for Mobile Communications (GSM). Here, the frequency is also called as measurement object (MO). The frequencies of different kinds may be used for a same measurement purpose, e.g., the frequencies of LTE (E-UTRAN) and the frequencies of NR are both used for RRM measurement, or positioning measurement or PRS measurement. The frequencies of different kinds may also be used for different measurement purposes, e.g., the frequencies of LTE (E-UTRAN) are used for RRM measurement while the frequencies of NR are used for positioning measurement or PRS measurement, or the frequencies of LTE (E-UTRAN) are used for positioning measurement or PRS measurement while the frequencies of NR are used for RRM measurement.

The frequencies of different kinds may further include an intra-frequency carrier, an inter-frequency carrier, or an inter-RAT carrier.

During the implementation, a first factor is indicated to the UE, and the first factor is used to indicate proportions or percentages of the measurement gap for different measurement purposes. In addition, a second factor is indicated to the UE, and the second factor is used to indicate proportions or percentages of the measurement gap for different frequencies.

Correspondingly, at the UE side, the UE obtains the first factor, and first factor is used to indicate the proportions or percentages of the measurement gap for different measurement purposes. In addition, the UE obtains the second factor, and the second factor is used to indicate the proportions or percentages of the measurement gap for different frequencies.

To be specific, the above obtaining includes that factor-related information is received by the UE from the network, or factor-related information is predefined in a protocol.

The first factor may be also understood as to be used to indicate the sharing of the measurement gap, i.e., indicate how to share the measurement gap for different measurement purposes.

Various values of the first factor are configured by the network or defined in a protocol. Taking two measurement purposes as an example, the first factor is used to indicate the proportions or percentages of the measurement gap for a first measurement purpose and a second measurement purpose, and a measurement duration of a measurement object for each measurement purpose needs to be multiplied by the factor or a reciprocal of the factor.

For example, when a value of the first factor is Y and Y is an integer, a measurement duration of a measurement object for the first measurement purpose needs to be multiplied by 1/Y*100, and a measurement duration of a measurement object for the second measurement purpose needs to be multiplied by 1/(100-Y)*100.

For another example, when a value of the first factor is X, a measurement duration of a measurement object for the first measurement purpose needs to be multiplied by 1/X, and a measurement duration of a measurement object for the second measurement purpose needs to be multiplied by 1/(1-X).

For yet another example, when the first factor indicates that the measurement gap is used for positioning with a probability of ⅓ and for RRM measurement with a probability of ⅔, a measurement duration for positioning is 3*T1 (T1 is a duration corresponding to a certain quantity of sampling times), and a measurement duration for RRM measurement at a certain frequency is 1.5*T2 (T2 is a duration corresponding to a certain quantity of sampling times).

The second factor is also understood as to be used to indicate the sharing of the measurement gap, i.e., indicate how to share the measurement gap for different measurement purposes. The second factor is used to indicate at least one of proportions or percentages of the measurement gap for an LTE (E-UTRAN) frequency, proportions or percentages of the measurement gap for an NR frequency, proportions or percentages of the measurement gap for a GSM frequency, proportions or percentages of the measurement gap for an intra-frequency carrier, proportions or percentages of the measurement gap for an inter-frequency carrier, proportions or percentages of the measurement gap for an inter-RAT carrier, or proportions or percentages of the measurement gap for an inter-frequency inter-RAT carrier.

Further, different second factors are configured in different scenarios, e.g., E-UTRANAR dual connectivity with a Master Cell Group (MCG) using E-UTRA and a Secondary Cell Group (SCG) using NR (EN-DC), NR-E-UTRA dual connectivity (NE-DC), NR Standalone (SA), NR-DC, and NR-LTE.

First Embodiment: in an EN-DC scenario, the second factor indicates proportions or percentages of the measurement gap used by the LTE (E-UTRAN) frequencies. In the LTE (E-UTRAN) frequencies, the NR frequencies and/or the other frequencies, a larger ratio or percentage of the measurement gap is allocated for the LTE (E-UTRAN) frequencies. In this way, it is able to improve the mobility of an MN node (an anchor node) in the EN-DC scenario.

Second Embodiment: in an NE-DC scenario, the second factor indicates proportions or percentages of the measurement gap used by the NR frequencies. In the LTE (E-UTRAN) frequencies, the NR frequencies and/or the other frequencies, a larger ratio or percentage of the measurement gap is allocated for the NR frequencies. In this way, it is able to improve the mobility of an MN node (an anchor node) in the NE-DC scenario.

Third Embodiment: in an NR SA scenario, the second factor indicates proportions or percentages of the measurement gap used by the NR frequencies. In the LTE (E-UTRAN) frequencies, the NR frequencies and/or the other frequencies, a larger ratio or percentage of the measurement gap is allocated for the NR frequencies. In this way, it is able to improve the mobility in the NR SA scenario.

Fourth Embodiment: in an NR-DC scenario, the second factor indicates proportions or percentages of the measurement gap used by the NR frequencies. In the LTE (E-UTRAN) frequencies, the NR frequencies and/or the other frequencies, a larger ratio or percentage of the measurement gap is allocated for the NR frequencies. In this way, it is able to improve the mobility in the NR-DC scenario.

Fifth Embodiment: in an LTE SA scenario, the second factor indicates proportions or percentages of the measurement gap used by the LTE (E-UTRAN) frequencies. In the LTE (E-UTRAN) frequencies, the NR frequencies and/or the other frequencies, a larger ratio or percentage of the measurement gap is allocated for the LTE (E-UTRAN) frequencies. In this way, it is able to improve the mobility in the LTE SA scenario.

During the implementation, the measurement method further includes using, by the UE, the measurement gaps for N measurement purposes equiprobably, where N is a natural number greater than 2.

To be specific, the using, by the UE, the measurement gaps for N measurement purposes equiprobably includes: using, by the UE, the measurement gaps for N measurement purposes equiprobably, the measurement gaps being equiprobably used for a plurality of measurement frequencies in each measurement purpose of the N measurement purposes; or using, by the UE, the measurement gaps for N measurement purposes equiprobably, the measurement gaps being not equiprobably used for a plurality of measurement frequencies in each measurement purpose; or using, by the UE, the measurement gaps for N measurement purposes equiprobably, the measurement gaps being not equiprobably used for measurement frequencies in K measurement purposes and measurement frequencies in the other measurement purposes, where K is an integer greater than 1.

During the implementation, a plurality of measurement frequencies included in an $M^{th}$ measurement purpose is taken as one frequency to share a measurement gap with frequencies for the other measurement purpose, where M is a natural number.

To be specific, when the plurality of measurement frequencies included in the $M^{th}$ measurement purpose is taken as one frequency to share the measurement gap with frequencies for the other measurement purpose, the plurality of measurement frequencies in the $M^{th}$ measurement purpose, as one frequency, compete with the frequencies in the other measurement purposes for using the measurement gap.

For example, taking two measurement purposes, i.e., the PRS measurement and the RRM measurement, as an example, the PRS measurement includes M PRS layers and the RRM measurement includes N RRM layers. The M PRS layers are taken as one layer to share the measurement gap with the other N RRM layers. In other words, when calculating a carrier-specific scaling factor (CSSF), merely one PRS layer needs to be taken into consideration for the PRS measurement. A measurement duration of the M PRS layers is a sum of the measurement duration of each PRS Layer.

During the implementation, the measurement method further includes notifying a third factor to the UE, and the third factor is used to indicate usage proportions or usage percentages of different measurement gaps.

Correspondingly, at the UE side, the measurement method further includes obtaining the third factor, and the third factor is used to indicate usage proportions or usage percentages of different measurement gaps.

To be specific, various values of the third factor are configured by a network or defined in a protocol. Further, the usage proportions or usage percentages of different measurement gaps indicated in the third factor include: a usage proportions or usage percentages of a certain measurement gap in the plurality of measurement gaps within a certain time period; or usage proportions or usage percentages of different measurement gaps of the UE at an overlapping portion when the plurality sets of measurement gaps overlap (completely or partially) each other.

For example, when MG1 is used for positioning, MG2 is used for RRM and MG1 completely overlaps MG2, FIG. 5 shows the ratio or percentage of the measurement gap. As shown in FIG. 5, the third factor is used to notify the UE of the usage proportions or usage percentages of MG1 and MG2.

When a value of the third factor is ⅓, it indicates that MG1 is used (for positioning) with a probability of ⅓ and MG2 is used (for RRM) with a probability of ⅔. Correspondingly, a measurement duration of a plurality of measurement frequencies for positioning needs to be multiplied by 3, and a measurement duration of a plurality of measurement frequencies for RRM measurement needs to be multiplied by 3/2.

During the implementation, second information is indicated to the UE, the second information is used to indicate priority level of the one measurement gap or the at least two measurement gaps, and the UE performs measurement in the measurement gap indicated by the priority.

Correspondingly, at the UE side, the measurement method further includes receiving, by the UE, the second information, the second information is used to indicate priority level of the one measurement gap or the at least two measurement gaps, and the UE performs measurement merely in the measurement gap indicated by the priority.

To be specific, the priority of the measurement gaps indicated through the second information include: priority of a certain measurement gap in the plurality of measurement gaps within a certain time period; or priority of a measurement gap used by the UE at an overlapping portion when the measurement gaps overlap (completely or partially) each other.

During the implementation, the measurement method further includes receiving, by the network, a notification indicating that a current measurement purpose has been achieved or a request for a measurement gap for the other measurement purpose from the UE.

Correspondingly, at the UE side, the measurement method further includes transmitting, by the UE, the notification indicating that the current measurement purpose has been achieved or the request for the measurement gap for the other measurement purpose to the network.

To be specific, the other measurement purpose refers to a measurement purpose other than the current measurement purpose.

The UE transmits the notification indicating that the current measurement purpose has been achieved or the request for the measurement gap for the other measurement purpose to the network, and the network configures one or more of a measurement gap pattern, the first factor, the third factor or the second information in accordance with the above-mentioned information.

To be specific, when the current measurement purpose is positioning, a network device is a positioning server or a base station.

During the implementation, the measurement method further includes: upon the receipt of a notification indicating that the positioning has been ended from the UE, transmitting a measurement gap pattern and a measurement factor to the UE; or upon the receipt of a request for a measurement gap for RRM measurement from the UE, transmitting the measurement gap pattern and the measurement factor to the UE.

Correspondingly, at the UE side, the measurement method further includes: notifying the base station after the positioning has been ended so that the base station transmits the measurement gap pattern and the measurement factor to the UE; or transmitting, by the UE, the request for the measurement gap for RRM measurement to the network, so that the base station transmits the measurement gap pattern and the measurement factor to the UE.

To be specific, when merely a first measurement gap is configured within a certain time period and the first measurement gap is merely used for positioning, during the positioning, the UE merely performs the positioning measurement rather than RRM measurement. Hence, the UE transmits signaling to the network, and the signaling is used to notify that the positioning has been ended, or request the network to configure the measurement gap for RRM measurement.

During the implementation, the measurement method further includes transmitting, by the network, third information to the UE. The third information includes at least one of: N pieces of duration information, the duration information including a usage duration of the measurement gap and/or a start position of the measurement gap, N being an integer; M timers, each timer being used to indicate a usage duration of a measurement gap, or the other measurement gap different from the current measurement gap or a measurement gap used in the timer after the timer has been expired; or Q counters, each counter being used to indicate the number of times a measurement gap is used, or the other measurement gap different from the current measurement gap or a measurement gap used in the counter after the counter has been expired.

To be specific, a conversion mechanism for the plurality of measurement gaps is adopted, and a measurement gap conversion indicator is introduced and issued by the network.

During the implementation, the base station notifies the UE to use the plurality of measurement gaps through one or more of: notifying the UE to perform the measurement using a first measurement gap within a first duration upon the receipt of the first measurement gap for the first duration at a first time point, notifying the UE to perform the measurement using a second measurement gap within a second duration upon the receipt of the second measurement gap for the second duration at a second time point, and notifying the UE to perform the measurement using an $N^{th}$ measurement gap within an $N^{th}$ duration upon the receipt of the $N^{th}$ measurement gap for the $N^{th}$ duration at an $N^{th}$ time point; configuring M timers, starting a first timer after using the first measurement gap, notifying the UE to use the second measurement gap after the first timer has been expired, starting a second timer after using the second measurement gap, and notifying the UE to use an $M^{th}$ measurement gap after an $(M-1)^{th}$ timer has been expired; or configuring Q counters, notifying the UE to use the second measurement gap after a first counter has been expired, notifying the UE to use a third measurement gap after a second counter has been expired, and notifying the UE to use the $M^{th}$ measurement gap after an $(M-1)^{th}$ counter has been expired.

To be specific, MG1 is issued at a time point N1 for the measurement within a duration T1, and MG2 is issued at a time point N2 for the measurement within a duration T2. Upon the receipt of the MG conversion indicator from the network, the UE performs the measurement using MG1 within the duration T1, performs the measurement using MG2 within the duration T2, and so on.

To be specific, the timer is introduced to control a duration of each MG. For example, MG1 is issued at the time point N1, and a timer1 is started; after the timer 1 has been expired, the UE is converted to MG2, and a timer2 is started; and after the timer2 has been expired, the UE is converted to MG1, and so on. Alternatively, whether to start the measurement gap conversion is indicated by the network through the measurement gap conversion indicator issued by the network.

To be specific, MG1 is issued at the time point N1, and it is used for M times. MG2 is issued at the time point N2, and it is used for N times. In other words, the UE is converted to MG2 after MG1 is used for M times, converted to MG1 again after MG2 is used for N times, and so on. Alternatively, whether to start the measurement gap conversion is indicated by the network through the measurement gap conversion indicator issued by the network.

Correspondingly, at the UE side, the UE uses a plurality of measurement gaps through one or more of: performing the measurement using a first measurement gap within a first duration upon the receipt of the first measurement gap for the first duration at a first time point, performing the measurement using a second measurement gap within a second duration upon the receipt of the second measurement gap for the second duration at a second time point, and performing the measurement using an $N^{th}$ measurement gap within an $N^{th}$ duration upon the receipt of the $N^{th}$ measurement gap for the $N^{th}$ duration at an $N^{th}$ time point; configuring M timers, starting a first timer after using the first measurement gap, using the second measurement gap after the first timer has been expired, starting a second timer after using the second measurement gap, and using an $M^{th}$ measurement gap after an $(M-1)^{th}$ timer has been expired; or configuring Q counters, using the second measurement gap after a first counter has been expired, using a third measurement gap after a second counter has been expired, and using the $M^{th}$ measurement gap after an $(M-1)^{th}$ counter has been expired.

During the implementation, the measurement method further includes one or more of: notifying usage priority of a plurality of measurement gaps to the UE, or agreeing with the UE in advance about the usage priority of the plurality of measurement gaps; or notifying proportions or percentages of different measurement gaps within a predetermined time period or at an overlapping time point to the UE.

Correspondingly, at the UE side, the measurement method further includes one or more of: receiving usage priority of a plurality of measurement gaps from the network, or agreeing with the network in advance about the priority of the plurality of measurement gaps; or receiving proportions or percentages of different measurement gaps within a predetermined time period or at an overlapping time point from the network.

To be specific, when two measurement gaps are configured within a certain time period, i.e., a first measurement gap MG1 (a newly-introduced measurement gap) merely for positioning and a second measurement gap MG2 (an existing measurement gap). FIG. 4 shows a relationship between time-domain positions of MG1 and MG2. As shown in FIG. 4, in order to prevent the occurrence of any conflict between MG1 and MG2, priority of the positioning measurement and the RRM measurement or priority of the measurement gaps are introduced (the priority is indicated by the network or defined in a protocol, and one MG is adopted by the UE for a certain measurement purpose); or a third factor (or a second weight value) is introduced (this factor indicates to the UE the proportions or percentages of MG1 and MG2 within a certain time period or at a certain overlapping time point).

During the implementation, the measurement method further includes receiving, by the network from the UE, a measurement gap pattern or a measurement gap identifier for positioning and supported by the UE.

Correspondingly, at the UE side, the measurement method further includes: receiving, by the network from the UE, information indicating whether the UE supports to perform RRM measurement using the measurement gap pattern; and/or receiving, by the network device from the UE, information indicating whether the UE supports to perform the measurement for at least two measurement purposes within the measurement gap.

To be specific, a UE capability is introduced so as to indicate whether the UE supports the measurement gap for positioning.

The RRM measurement may include SSB measurement (i.e., the measurement of an SSB-based RRM measurement timing configuration (SMTC) and/or CSI-RS measurement.

Various new measurement gap patterns are introduced for the positioning, and the UE may not support all the introduced measurement gap patterns. At this time, a UE capability is introduced so as to indicate the measurement gap pattern or measurement gap identifier for positioning and supported by the UE. For example, in a feasible mode, a sequence having a length of N bits is introduced, and each bit corresponds to a measurement gap for positioning. When a value of each bit is 1, it means that the UE supports the measurement gap pattern for positioning, and when a value of each bit is 0, it means that the UE does not support the measurement gap pattern for positioning.

During the implementation, the measurement method further includes indicating whether the UE supports to use the measurement gap pattern for RRM measurement.

Correspondingly, at the UE side, the measurement method further includes receiving from the base station an indicator indicating whether the UE supports to use the measurement gap pattern for RRM measurement.

To be specific, a UE capability is introduced so as to indicate whether the UE supports to use the introduced measurement gap pattern for RRM measurement.

Based on a same inventive concept, the present disclosure further provides in some embodiments a base station, a UE and a computer-readable storage medium. The principle of these devices for solving the problem is similar to that of the measurement method, so the implementation of these devices may refer to that of the measurement method, which will not be particularly defined herein.

The technical solutions in the embodiments of the present disclosure will be implemented as follows.

As shown in FIG. 6, the present disclosure further provides in some embodiments a base station, which includes: a processor 600 configured to read a program in a memory 620, so as to transmit first information to a UE, the first information including one measurement gap or at least two measurement gaps; and a transceiver 610 configured to receive and transmit data under the control of the processor 600.

During the implementation, when the first information includes one measurement gap, the one measurement gap is used for at least two measurement purposes; or when the first information includes at least two measurement gaps, each of the at least two measurement gaps is used for one measurement purpose; or when the first information includes one measurement gap or at least two measurement gaps, the measurement gap is used for measurement at at least two frequencies.

During the implementation, the processor is further configured to: notify a first factor to the UE, the first factor being used to indicate proportions or percentages of the measurement gap for different measurement purposes; and/or notify a second factor to the UE, the second factor being used to indicate proportions or percentages of the measurement gap for different frequencies.

During the implementation, the processor is further configured to notify a third factor to the UE, and the third factor is used to indicate usage proportions or usage percentages of different measurement gaps.

During the implementation, the processor is further configured to notify second information to the UE, the second information is used to indicate priority level of the one measurement gap or the at least two measurement gaps, and the UE performs measurement in the measurement gap indicated by the priority.

During the implementation, the processor is further configured to receive a notification indicating that a current measurement purpose has been achieved or a request for a measurement gap for the other measurement purpose from the UE.

During the implementation, the processor is further configured to transmit third information to the UE. The third information includes at least one of: N pieces of duration information, the duration information including a usage duration of the measurement gap and/or a start position of the measurement gap, N being an integer; M timers, each timer being used to indicate a usage duration of a measurement gap, or the other measurement gap different from the current measurement gap or a measurement gap used in the timer after the timer has been expired; or Q counters, each counter being used to indicate the number of times a measurement gap is used, or the other measurement gap different from the current measurement gap or a measurement gap used in the counter after the counter has been expired.

During the implementation, the base station notifies the UE to use a plurality of measurement gaps through one or more of: notifying the UE to perform the measurement using a first measurement gap within a first duration upon the receipt of the first measurement gap for the first duration at a first time point, notifying the UE to perform the measurement using a second measurement gap within a second duration upon the receipt of the second measurement gap for the second duration at a second time point, and notifying the UE to perform the measurement using an $N^{th}$ measurement gap within an $N^{th}$ duration upon the receipt of the $N^{th}$ measurement gap for the $N^{th}$ duration at an $N^{th}$ time point; configuring M timers, starting a first timer after using the first measurement gap, notifying the UE to use the second measurement gap after the first timer has been expired, starting a second timer after using the second measurement gap, and notifying the UE to use an $M^{th}$ measurement gap after an $(M-1)^{th}$ timer has been expired; or configuring Q counters, notifying the UE to use the second measurement gap after a first counter has been expired, notifying the UE to use a third measurement gap after a second counter has been expired, and notifying the UE to use the $M^{th}$ measurement gap after an $(M-1)^{th}$ counter has been expired.

During the implementation, the processor is further configured to perform one or more of: notifying priority of a plurality of measurement gaps to the UE, or agreeing with the UE in advance about the priority of the plurality of measurement gaps; or notifying usage proportions or usage percentages of different measurement gaps within a predetermined time period or at an overlapping time point to the UE.

During the implementation, the processor is further configured to receive from the UE a measurement gap pattern or a measurement gap identifier for positioning and supported by the UE.

During the implementation, the processor is further configured to: receive from the UE information indicating whether the UE supports to perform RRM measurement using the measurement gap pattern; and/or receive from the UE, information indicating whether the UE supports to perform the measurement for at least two measurement purposes within the measurement gap.

In FIG. 6, bus architecture may include a number of buses and bridges connected to each other, so as to connect various circuits for one or more processors 600 and one or more memories 620. In addition, as is known in the art, the bus architecture may be used to connect any other circuits, such as a circuit for a peripheral device, a circuit for a voltage stabilizer and a power management circuit. A bus interface may be provided, and the transceiver 610 may consist of a plurality of elements, i.e., a transmitter and a receiver for communication with any other devices over a transmission medium. The processor 600 may take charge of managing the bus architecture as well as general processings. The memory 620 may store therein data for the operation of the processor 600.

The present disclosure further provides in some embodiments a base station, which includes a base station transmission module configured to transmit first information to a UE, the first information including one measurement gap or at least two measurement gaps.

During the implementation, when the first information includes one measurement gap, the one measurement gap is used for at least two measurement purposes; or when the first information includes at least two measurement gaps, each of the at least two measurement gaps is used for one measurement purpose; or when the first information includes one measurement gap or at least two measurement gaps, the measurement gap is used for measurement at least two frequencies.

During the implementation, the base station transmission module is further configured to: notify a first factor to the UE, the first factor being used to indicate proportions or percentages of the measurement gap for different measurement purposes; and/or notify a second factor to the UE, the second factor being used to indicate proportions or percentages of the measurement gap for different frequencies.

During the implementation, the base station transmission module is further configured to notify a third factor to the UE, and the third factor is used to indicate usage proportions or usage percentages of different measurement gaps.

During the implementation, the base station transmission module is further configured to notify second information to the UE, the second information is used to indicate priority level of the one measurement gap or the at least two measurement gaps, and the UE performs measurement in the measurement gap indicated by the priority.

During the implementation, the base station further includes a base station reception module configured to receive a notification indicating that a current measurement purpose has been achieved or a request for a measurement gap for the other measurement purpose from the UE.

During the implementation, the base station transmission module is further configured to transmit third information to the UE. The third information includes at least one of: N pieces of duration information, the duration information including a usage duration of the measurement gap and/or a start position of the measurement gap, N being an integer; M timers, each timer being used to indicate a usage duration of a measurement gap, or the other measurement gap different from the current measurement gap or a measurement gap used in the timer after the timer has been expired; or Q counters, each counter being used to indicate the number of times a measurement gap is used, or the other measurement gap different from the current measurement gap or a measurement gap used in the counter after the counter has been expired.

During the implementation, the base station transmission module is further configured to indicate the UE to use a plurality of measurement gaps through one or more of: indicating the UE to perform the measurement using a first measurement gap within a first duration upon the receipt of the first measurement gap for the first duration at a first time point, indicating the UE to perform the measurement using a second measurement gap within a second duration upon the receipt of the second measurement gap for the second duration at a second time point, and indicating the UE to perform the measurement using an $N^{th}$ measurement gap within an $N^{th}$ duration upon the receipt of the $N^{th}$ measurement gap for the $N^{th}$ duration at an $N^{th}$ time point; configuring M timers, starting a first timer after using the first measurement gap, indicating the UE to use the second measurement gap after the first timer has been expired, starting a second timer after using the second measurement gap, and indicating the UE to use an $M^{th}$ measurement gap after an $(M-1)^{th}$ timer has been expired; or configuring Q counters, indicating the UE to use the second measurement gap after a first counter has been expired, indicating the UE to use a third measurement gap after a second counter has been expired, and indicating the UE to use the $M^{th}$ measurement gap after an $(M-1)^{th}$ counter has been expired.

During the implementation, the base station transmission module is further configured to perform one or more of: indicating priority of a plurality of measurement gaps to the UE, or agreeing with the UE in advance about the priority of the plurality of measurement gaps; or indicating usage proportions or usage percentages of different measurement gaps within a predetermined time period or at an overlapping time point to the UE.

During the implementation, the base station transmission module is further configured to receive from the UE a measurement gap pattern or a measurement gap identifier for positioning and supported by the UE.

During the implementation, the base station transmission module is further configured to: receive from the UE information indicating whether the UE supports to perform RRM measurement using the measurement gap pattern; and/or receive from the UE, information indicating whether the UE supports to perform the measurement for at least two measurement purposes within the measurement gap.

For ease of description, the components of the device are divided into various modules or units on the basis of their functions. It should be noted that, during the implementation, the functions of the modules or units may be achieved in one or more pieces of software or hardware.

As shown in FIG. 7, the present disclosure further provides in some embodiments a UE, which includes: a processor 700 configured to read a program in a memory 720, so as to receive first information transmitted by a network, the first information including one measurement gap or at least two measurement gaps; and a transceiver 710 configured to receive and transmit data under the control of the processor 700.

During the implementation, when the first information includes one measurement gap, the one measurement gap is used for at least two measurement purposes; or when the first information includes at least two measurement gaps, each of the at least two measurement gaps is used for one measurement purpose; or when the first information includes one measurement gap or at least two measurement gaps, the measurement gap is used for measurement at least two frequencies.

During the implementation, the processor is further configured to: obtain a first factor, the first factor being used to indicate proportions or percentages of the measurement gap for different measurement purposes; and/or obtain a second factor to the UE, the second factor being used to indicate proportions or percentages of the measurement gap for different frequencies.

During the implementation, the processor is further configured to use the measurement gaps for N measurement purposes equiprobably, where N is a natural number greater than 2.

During the implementation, a plurality of measurement frequencies included in an $M^{th}$ measurement purpose is taken as one frequency to share a measurement gap with frequencies for the other measurement purpose, where M is a natural number.

During the implementation, the processor is further configured to use a third factor, and the third factor is used to indicate usage proportions or usage percentages of different measurement gaps.

During the implementation, the processor is further configured to receive second information, the second information is used to indicate priority level of the one measurement gap or the at least two measurement gaps, and the UE performs measurement in the measurement gap indicated by the priority.

During the implementation, the processor is further configured to transmit a notification indicating that a current measurement purpose has been achieved or a request for a measurement gap for the other measurement purpose to the network.

During the implementation, the processor is further configured to receive third information transmitted by the network. The third information includes at least one of: N pieces of duration information, the duration information including a usage duration of the measurement gap and/or a start position of the measurement gap, N being an integer; M timers, each timer being used to indicate a usage duration of a measurement gap, or the other measurement gap different from the current measurement gap or a measurement gap used in the timer after the timer has been expired; or Q counters, each counter being used to indicate the number of times a measurement gap is used, or the other measurement gap different from the current measurement gap or a measurement gap used in the counter after the counter has been expired.

During the implementation, the processor is configured to use a plurality of measurement gaps through one or more of: performing the measurement using a first measurement gap within a first duration upon the receipt of the first measurement gap for the first duration at a first time point, performing the measurement using a second measurement gap within a second duration upon the receipt of the second measurement gap for the second duration at a second time point, and performing the measurement using an $N^{th}$ measurement gap within an $N^{th}$ duration upon the receipt of the $N^{th}$ measurement gap for the $N^{th}$ duration at an $N^{th}$ time point; configuring M timers, starting a first timer after using the first measurement gap, using the second measurement gap after the first timer has been expired, starting a second timer after using the second measurement gap, and using an $M^{th}$ measurement gap after an $(M-1)^{th}$ timer has been expired; or configuring Q counters, using the second measurement gap after a first counter has been expired, using a third measurement gap after a second counter has been expired, and using the $M^{th}$ measurement gap after an $(M-1)^{th}$ counter has been expired.

During the implementation, the processor is further configured to perform one or more of: receiving priority of a plurality of measurement gaps from the network, or agreeing with the network in advance about the priority of the plurality of measurement gaps; or receiving usage proportions or usage percentages of different measurement gaps within a predetermined time period or at an overlapping time point from the network.

During the implementation, the processor is further configured to report to the network a measurement gap pattern or a measurement gap identifier for positioning and supported by the UE.

During the implementation, the processor is further configured to: report to the network information indicating whether the UE supports to perform RRM measurement using the measurement gap pattern; and/or report to the network information indicating whether the UE supports to perform the measurement for at least two measurement purposes within the measurement gap.

In FIG. 7, bus architecture may include a number of buses and bridges connected to each other, so as to connect various circuits for one or more processors 700 and one or more memories 720. In addition, as is known in the art, the bus architecture may be used to connect any other circuits, such as a circuit for a peripheral device, a circuit for a voltage stabilizer and a power management circuit. A bus interface may be provided, and the transceiver 710 may consist of a plurality of elements, i.e., a transmitter and a receiver for communication with any other devices over a transmission medium. With respect to different UEs, a user interface 730 may also be provided for devices which are to be arranged inside or outside the UE, and these devices may include but not limited to a keypad, a display, a speaker, a microphone and a joystick. The processor 700 may take charge of managing the bus architecture as well as general processings. The memory 720 may store therein data for the operation of the processor 700.

The present disclosure further provides in some embodiments a UE, which includes a UE reception module configured to receive first information transmitted by a network, the first information including one measurement gap or at least two measurement gaps.

During the implementation, when the first information includes one measurement gap, the one measurement gap is used for at least two measurement purposes; or when the first information includes at least two measurement gaps, each of the at least two measurement gaps is used for one measurement purpose; or when the first information includes one measurement gap or at least two measurement gaps, the measurement gap is used for measurement at least two frequencies.

During the implementation, the UE reception module is further configured to obtain a first factor, and the first factor is used to indicate proportions or percentages of the measurement gap for different measurement purposes.

During the implementation, the UE further includes a UE measurement module configured to use the measurement gaps for N measurement purposes equiprobably, where N is a natural number greater than 2.

During the implementation, a plurality of measurement frequencies included in an $M^{th}$ measurement purpose is taken as one frequency to share a measurement gap with frequencies for the other measurement purpose, where M is a natural number.

During the implementation, the UE reception module is further configured to use a third factor, and the third factor is used to indicate usage proportions or usage percentages of different measurement gaps.

During the implementation, the UE reception module is further configured to receive second information, the second information is used to indicate priority level of the one measurement gap or the at least two measurement gaps, and the UE performs measurement in the measurement gap indicated by the priority.

During the implementation, the UE reception module is further configured to transmit a notification indicating that a current measurement purpose has been achieved or a request for a measurement gap for the other measurement purpose to the network.

During the implementation, the UE reception module is further configured to receive third information transmitted by the network. The third information includes at least one of: N pieces of duration information, the duration information including a usage duration of the measurement gap and/or a start position of the measurement gap, N being an integer; M timers, each timer being used to indicate a usage duration of a measurement gap, or the other measurement gap different from the current measurement gap or a measurement gap used in the timer after the timer has been expired; or Q counters, each counter being used to indicate the number of times a measurement gap is used, or the other measurement gap different from the current measurement gap or a measurement gap used in the counter after the counter has been expired.

During the implementation, the UE measurement module is further configured to use a plurality of measurement gaps through one or more of: performing the measurement using a first measurement gap within a first duration upon the receipt of the first measurement gap for the first duration at a first time point, performing the measurement using a second measurement gap within a second duration upon the receipt of the second measurement gap for the second duration at a second time point, and performing the measurement using an $N^{th}$ measurement gap within an $N^{th}$ duration upon the receipt of the $N^{th}$ measurement gap for the $N^{th}$ duration at an $N^{th}$ time point; configuring M timers, starting a first timer after using the first measurement gap, using the second measurement gap after the first timer has been expired, starting a second timer after using the second measurement gap, and using an $M^{th}$ measurement gap after an (M-1) t timer has been expired; or configuring Q counters, using the second measurement gap after a first counter has been expired, using a third measurement gap after a second counter has been expired, and using the $M^{th}$ measurement gap after an $(M-1)^{th}$ counter has been expired.

During the implementation, the UE reception module is further configured to: receive priority of a plurality of measurement gaps from the network, or agreeing with the network in advance about the priority of the plurality of measurement gaps; and/or receive usage proportions or usage percentages of different measurement gaps within a predetermined time period or at an overlapping time point from the network.

During the implementation, the UE reception module is further configured to report to the network a measurement gap pattern or a measurement gap identifier for positioning and supported by the UE.

During the implementation, the UE reception module is further configured to: report to the network information indicating whether the UE supports to perform RRM measurement using the measurement gap pattern; and/or report to the network information indicating whether the UE supports to perform the measurement for at least two measurement purposes within the measurement gap.

The present disclosure further provides in some embodiments a computer-readable storage medium storing therein a computer program for implementing the above-mentioned measurement method.

The present disclosure further provides in some embodiments a computer program product stored in a non-volatile storage medium and executed by at least one processor so as to implement the above-mentioned measurement method.

The implementation of the computer program product may refer to that of the measurement method at the base station side and/or at the UE side.

In a word, according to the embodiments of the present disclosure, the first factor is introduced so as to indicate the ratio or percentage of a certain measurement gap for a first purpose (e.g., positioning) and a second purpose (e.g., RRM measurement). Various values of the first factor are configured by the network.

Further, the priority of the positioning measurement and RRM measurement or the priority of the plurality of measurement gaps are introduced, the priority are indicated by the network or defined in a protocol, and the UE uses a certain MG for a certain measurement purpose.

Further, the third factor is introduced, and in the case of a conflict among the measurement gaps within a certain time period or at a certain time point, the third factor is used to indicate the ratio or percentage of each measurement gap used by the UE. Various values of the third factor are configured by the network.

Further, a conversion mechanism of the first measurement gap (for positioning) and the second measurement gap (for RRM measurement) is introduced, and a measurement gap conversion start indicator and/or a measurement gap conversion end indicator are issued by the network.

Further, signaling transmitted by the UE to the network is introduced, and the signaling is used by the UE to notify the network that the positioning is ended or used by the UE to request the measurement gap for RRM measurement from the network.

Further, several UE capabilities are introduced, e.g., the UE capability for indicating whether the UE supports the measurement gap for positioning, the UE capability for indicating the measurement gap pattern for positioning or the measurement gap pattern identifier supported by the UE, and the UE capability for indicating whether the UE supports to perform the RRM measurement using the newly-introduced measurement gap pattern.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be appreciated that, the embodiments of the present disclosure may be implemented by hardware, software, firmware, middleware, microcode or a combination thereof. For the hardware implementation, the processor may include one or more of an Application Specific Integrated Circuit (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, compact disc-read only memory (Compact Disc-Read Only Memory, CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

It should be noted that those skilled in the art can make various modifications and variations to the present disclosure without departing from the spirit and scope of the present disclosure. Thus, if these modifications and variations fall within the scope of the claims of the present disclosure and equivalent technologies thereof, the present disclosure also intends to include these modifications and variations.

What is claimed is:

1. A measurement method, comprising:

receiving, by a User Equipment (UE), first information transmitted by a network, the first information comprising one measurement gap or at least two measurement gaps;

the measurement method further comprising:

receiving, by the UE, second information, wherein the second information is used to indicate priority of the one measurement gap or the at least two measurement gaps, in case of collision between the measurement gaps, the UE performs measurement in the measurement gap determined based on the priority;

the measurement method further comprising:

receiving, by the UE, third information transmitted by the network, wherein the third information comprises at least one of:

N pieces of duration information, the duration information indicating activation of the measurement gap, N being an integer;

M timers, the timer being used to indicate that it uses, after the timer has been expired, another measurement gap that is different from the current measurement gap or a measurement gap used in the timer; or Q counters, the counter being used to indicate the number of times a measurement gap is used, or indicate that it uses, after the counter has been expired, another measurement gap that is different from the current measurement gap or a measurement gap used in the counter.

2. The measurement method according to claim 1, wherein when the first information comprises one measurement gap, the one measurement gap is used for at least two measurement purposes; or when the first information comprises at least two measurement gaps, each of the at least two measurement gaps is used for one measurement purpose; or the first information comprises one measurement gap or at least two measurement gaps, the measurement gap is used for measurement at at least two frequencies.

3. The measurement method according to claim 1, further comprising:

obtaining, by the UE, a first factor, the first factor being used to indicate proportions or percentages of the measurement gap for different measurement purposes; and/or obtaining, by the UE, a second factor, the second factor being used to indicate proportions or percentages of the measurement gap for different frequencies.

4. The measurement method according to claim 1, further comprising using, by the UE, the measurement gaps for N measurement purposes equiprobably, where N is a natural number.

5. The measurement method according to claim 1, wherein a plurality of measurement frequencies comprised in an $M^{th}$ measurement purpose is taken as one frequency to share a measurement gap with a frequency for another measurement purpose, where M is a natural number.

6. The measurement method according to claim 1, further comprising:

obtaining, by the UE, a third factor, wherein the third factor is used to indicate usage proportions or usage percentages of different measurement gaps.

7. The measurement method according to claim 1, further comprising:

transmitting, by the UE to the network, a notification indicating that a current measurement purpose has been achieved or a request for a measurement gap for another measurement purpose.

8. The measurement method according to claim 1, wherein the UE uses a plurality of measurement gaps through one or more of: performing the measurement using a first measurement gap within a first duration upon the receipt of the first measurement gap for the first duration at a first time point, performing the measurement using a second measurement gap within a second duration upon the receipt of the second measurement gap for the second duration at a second time point, and performing the measurement using an $N^{th}$ measurement gap within an $N^{th}$ duration upon the receipt of the $N^{th}$ measurement gap for the $N^{th}$ duration at an $N^{th}$ time point; configuring M timers, starting a first timer after using the first measurement gap, using the second measurement gap after the first timer has been expired, starting a second timer after using the second measurement gap, and using an $M^{th}$ measurement gap after an $(M-1)^{th}$ timer has been expired; or configuring Q counters, using a second measurement gap after a first measurement gap reaches a first counter, using a third measurement gap after the second measurement gap reaches a second counter, and using an $M^{th}$ measurement gap after an $(M-1)^{th}$ measurement gap reaches an $(M-1)^{th}$ counter.

9. The measurement method according to claim 1, further comprising one or more of:

receiving usage priority of a plurality of measurement gaps that are notified by the network to the UE, or that are agreed by the UE and the network in advance; or receiving, from the network, usage proportions or usage percentages of different measurement gaps that are used by the UE within a predetermined time period or at an overlapping time point.

10. The measurement method according to claim 1, further comprising:

reporting, to the network, a measurement gap pattern or a measurement gap identifier this is used for positioning and supported by the UE.

11. The measurement method according to claim 1, further comprising:

reporting, to the network, information indicating whether the UE supports to perform Radio Resource Management (RRM) measurement using a measurement gap; and/or reporting, to the network, information indicating whether the UE supports to perform the measurement for at least two measurement purposes within the measurement gap.

12. A measurement method, comprising:

transmitting, by a network, first information to a UE, the first information comprising one measurement gap or at least two measurement gaps;

the measurement method further comprising:

notifying second information to the UE, wherein the second information is used to indicate priority level of the one measurement gap or the at least two measurement gaps, in case of collision between the measurement gaps, and the UE performs measurement in the measurement gap determined based on the priority;

the measurement method further comprising:

transmitting, by the network, third information to a UE, wherein the third information comprises at least one of:

N pieces of duration information, the duration information indicating activation of the measurement gap, N being an integer;

M timers, the timer being used to indicate that it uses, after the timer has been expired, another measurement gap that is different from the current measurement gap or a measurement gap used in the timer; or Q counters, the counter being used to indicate the number of times a measurement gap is used, or indicate that it uses, after the counter has been expired, another measurement gap that is different from the current measurement gap or a measurement gap used in the counter.

13. The measurement method according to claim 12, wherein when the first information comprises one measurement gap, the one measurement gap is used for at least two measurement purposes; or when the first information comprises at least two measurement gaps, each of the at least two measurement gaps is used for one measurement purpose; or the first information comprises one measurement gap or at least two measurement gaps, the measurement gap is used for measurement at at least two frequencies.

14. The measurement method according to claim 12, further comprising:

notifying a first factor to the UE, the first factor being used to indicate proportions or percentages of the measurement gap for different measurement purposes; and/or notifying a second factor to the UE, the second factor being used to indicate proportions or percentages of the measurement gap for different frequencies.

15. The measurement method according to claim 12, further comprising:

notifying a third factor to the UE, wherein the third factor is used to indicate usage proportions or usage percentages of different measurement gaps.

16. A base station, comprising:

a processor configured to read a program in a memory to implement the measurement method according to claim 12;

a transceiver configured to receive and transmit data under control of the processor.

17. A UE, comprising:

a processor configured to read a program in a memory to: receive first information transmitted by a network, the first information comprising one measurement gap or at least two measurement gaps;

a transceiver configured to receive and transmit data under control of the processor;

the processor is further configured to receive second information, wherein the second information is used to indicate priority level of the one measurement gap or the at least two measurement gaps, in case of collision between the measurement gaps, and the UE performs measurement in the measurement gap determined based on the priority;

the processor is further configured to receive third information transmitted by the network, wherein the third information comprises at least one of:

N pieces of duration information, the duration information indicating activation of the measurement gap, N being an integer;

M timers, the timer being used to indicate that it uses, after the timer has been expired, another measurement gap that is different from the current measurement gap or a measurement gap used in the timer; or Q counters, the counter being used to indicate the number of times a measurement gap is used, or indicate that it uses, after the counter has been expired, another measurement gap that is different from the current measurement gap or a measurement gap used in the counter.

* * * * *